(12) United States Patent
Crawford

(10) Patent No.: US 6,456,245 B1
(45) Date of Patent: Sep. 24, 2002

(54) CARD-BASED DIVERSITY ANTENNA STRUCTURE FOR WIRELESS COMMUNICATIONS

(75) Inventor: James A. Crawford, San Diego, CA (US)

(73) Assignee: Magis Networks, Inc., San Diego, CA (US)

( * ) Notice: Subject to any disclaimer, the term of this patent is extended or adjusted under 35 U.S.C. 154(b) by 0 days.

(21) Appl. No.: 09/735,977

(22) Filed: Dec. 13, 2000

(51) Int. Cl.$^7$ ................................................ H01Q 1/24
(52) U.S. Cl. ............................ 343/702; 343/700 MS; 455/277.1
(58) Field of Search .................... 343/700 MS, 702, 343/725, 846, 849; 235/492; 455/275, 277.1; H01Q 1/24

(56) References Cited

U.S. PATENT DOCUMENTS

| | | | |
|---|---|---|---|
| 3,488,445 A | 1/1970 | Chang | 179/15 |
| 4,538,153 A | 8/1985 | Taga | 343/700 |
| 5,138,328 A | 8/1992 | Zibrik et al. | 343/702 |
| 5,146,232 A | 9/1992 | Nishikawa et al. | 343/713 |
| 5,282,222 A | 1/1994 | Fattouche et al. | 375/1 |
| 5,369,670 A | 11/1994 | Zagloul et al. | 375/84 |
| 5,402,136 A | 3/1995 | Goto et al. | 343/729 |
| 5,410,748 A | 4/1995 | Hayashi et al. | 455/277.1 |
| 5,420,599 A | 5/1995 | Erkocevic | 343/828 |
| 5,463,406 A | 10/1995 | Vannatta | 343/725 |
| 5,486,836 A | 1/1996 | Kuffner et al. | 343/700 |
| 5,487,069 A | 1/1996 | O'Sullivan et al. | 370/94.3 |
| 5,552,798 A | 9/1996 | Dietrich et al. | 343/893 |
| 5,555,268 A | 9/1996 | Fattouche et al. | 375/206 |
| 5,650,788 A | 7/1997 | Jha | 343/700 |
| 5,657,028 A | 8/1997 | Sanad | 343/700 |
| 5,680,144 A | 10/1997 | Sanad | 343/700 |
| 5,832,031 A * | 11/1998 | Hammons | 375/262 |
| 5,832,044 A | 11/1998 | Sousa et al. | 375/347 |
| 5,867,131 A * | 2/1999 | Camp et al. | 343/797 |
| 5,936,580 A * | 8/1999 | Van Puijenbrock | 343/700 MS |
| 5,943,020 A | 8/1999 | Liebendoerfer et al. | 343/702 |
| 5,990,838 A | 11/1999 | Burns et al. | 343/702 |
| 5,991,864 A * | 11/1999 | Kinney et al. | 712/1 |
| 5,995,062 A | 11/1999 | Denney et al. | 343/853 |
| 6,008,774 A | 12/1999 | Wu | 343/828 |
| 6,031,503 A | 2/2000 | Preiss, II et al. | 343/770 |
| 6,043,790 A | 3/2000 | Derneryd et al. | 343/853 |
| 6,054,955 A | 4/2000 | Schlegeli et al. | |
| 6,091,364 A | 7/2000 | Murakami et al. | 343/700 |
| 6,104,349 A | 8/2000 | Cohen | |
| 6,115,762 A * | 9/2000 | Bell et al. | 710/62 |
| 6,160,514 A | 12/2000 | Judd | 343/700 |
| 6,198,460 B1 | 3/2001 | Brankovic | 343/879 |
| 6,222,503 B1 | 4/2001 | Gietema et al. | 343/890 |
| 6,181,284 B1 * | 1/2002 | Madsen et al. | 343/702 |

OTHER PUBLICATIONS

U.S. patent application Ser. No. 09/693,465, Crawford, filed Oct. 19, 2000.
U.S. patent application Ser. No. 09/799,411, Crawford, filed Mar. 5, 2001.

* cited by examiner

*Primary Examiner*—Tho G. Phan
(74) *Attorney, Agent, or Firm*—Fitch, Even, Tabin & Flannery

(57) ABSTRACT

A card-based diversity antenna structure includes a card and at least two antenna elements. The card has active circuitry attached thereto and connectors located at a first end thereof configured for engagement with an interface slot. The at least two antenna elements are attached to the card at a second end thereof and are coupled to the active circuitry. At least two antenna elements are sufficiently spaced apart so as to achieve spatial diversity. The polarizations of two of the at least two antenna elements may be orthogonal to each other so as to achieve polarization diversity. The antenna structure delivers good receive and transmit diversity performance and is well suited to the form factor limits imposed by the dimensions of small cards, such as PCMCIA cards. The configuration is very convenient for application in the 5 to 6 GHz frequency band.

56 Claims, 11 Drawing Sheets

CARD-BASED DIVERSITY ANTENNA STRUCTURE FOR WIRELESS COMMUNICATIONS

BACKGROUND OF THE INVENTION

1. Field of the Invention

The present invention relates generally to antennas, and more specifically to small antenna structures possessing diversity characteristics.

2. Discussion of the Related Art

A multipath environment is created when radio frequency (RF) signals propagate over more than one path from the transmitter to the receiver. Alternate paths with different propagation times are created when the RF signal reflects from objects that are displaced from the direct path. The direct and alternate path signals sum at the receiver antenna to cause constructive and destructive interference, which have peaks and nulls. When the receiver antenna is positioned in a null, received signal strength drops and the communication channel is degraded or lost. The reflected signals may experience a change in polarization relative to the direct path signal. This multipath environment is typical of indoor and in-office wireless local area networks (WLAN).

An approach to addressing the multipath problem is to employ multiple receiver antenna elements in order to selectively receive a signal from more than one direction or from a slightly different position. This approach, known as "diversity", is achieved when receiving signals at different points in space or receiving signals with different polarization. Performance is further enhanced by isolating the separate antennas. Wireless communication link bit error rate (BER) performance is improved in a multipath environment if receive and/or transmit diversity is used.

Conventional antenna structures that employ diversity techniques tend to be expensive and physically large structures that utilize bulky connectors, such as coaxial cable connectors. Such antenna structures are not suitable for residential and office use where low-cost and small physical size are highly desirable characteristics. Thus, there is a need for antenna structures capable of employing diversity techniques that overcomes these and other disadvantages.

SUMMARY OF THE INVENTION

The present invention advantageously addresses the needs above as well as other needs by providing an antenna structure that includes a card, at least two antenna elements, and active circuitry. The at least two antenna elements are attached to the card at a first end thereof. The active circuitry is attached to the card and coupled to the at least two antenna elements. At least two of the at least two antenna elements are sufficiently spaced apart so as to achieve spatial diversity.

In another embodiment, the invention can be characterized as an antenna structure that includes a card, at least two antenna elements, and active circuitry. The at least two antenna elements are attached to the card at a first end thereof. The active circuitry is attached to the card and coupled to the at least two antenna elements. A first of the at least two antenna elements comprises a polarization that is orthogonal to a polarization of a second of the at least two antenna elements so as to achieve polarization diversity.

In a further embodiment, the invention can be characterized as a method of receiving a signal in a multi-path environment. The method includes the steps of: placing a card in the multi-path environment, the card having active circuitry attached thereto; receiving the signal with a first antenna element attached to the card at a first end thereof; and receiving the signal with a second antenna element attached to the card at the first end thereof; wherein the first and second antenna elements are coupled to the active circuitry.

In an additional embodiment, the invention can be characterized as a method of transmitting a signal in a multi-path environment. The method includes the steps of: placing a card in the multi-path environment, the card having active circuitry attached thereto; transmitting the signal with a first antenna element attached to the card at a first end thereof; and transmitting the signal with a second antenna element attached to the card at the first end thereof; wherein the first and second antenna elements are coupled to the active circuitry.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is not to be taken in a limiting sense, but is made merely for the purpose of describing the general principles of the invention. The scope of the invention should be determined with reference to the claims.

Figure 1:
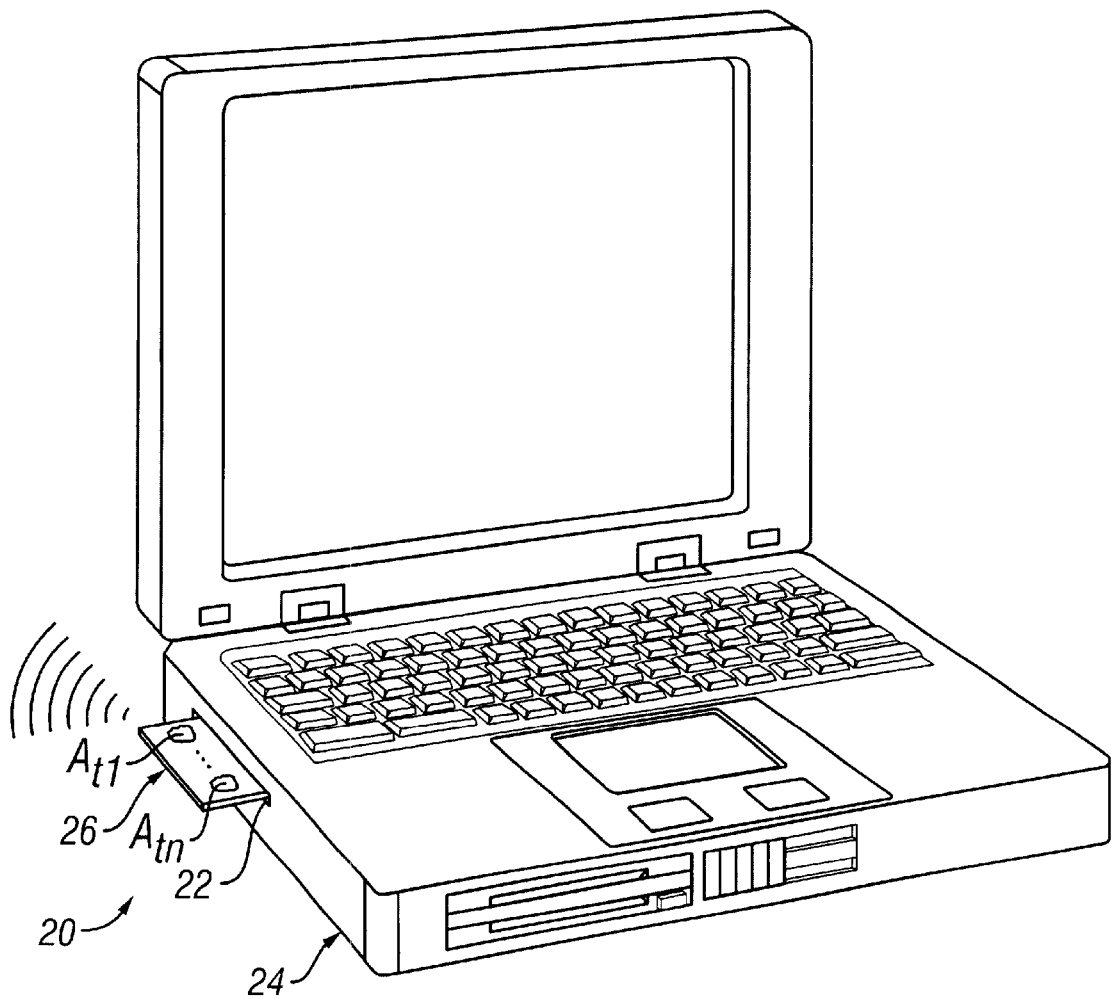
FIG. 1 is a perspective diagram illustrating a computer having inserted therein a multi-antenna element structure made in accordance with an embodiment of the present invention.

Referring to FIG. 1, there is illustrated a multi-antenna element structure 20 made in accordance with an embodiment of the present invention. The multi-antenna element structure 20 is ideal for use as a diversity antenna and overcomes the disadvantages described above. It provides receive and/or transmit diversity in a multipath environment so that wireless communication link bit error rate (BER) performance is improved. The multi-antenna element structure 20 is extremely well suited to small form-factor applications that are to be used at high frequencies, including the 5 to 6 gigahertz (GHz) frequency band. Moreover, the multi-antenna element structure 20 is particularly suited for use in wireless local area networks (WLAN).

The multi-antenna element structure 20 may be conveniently inserted into an interface slot 22 of a computer 24. Although a notebook computer is illustrated, it should be well understood that the computer 24 may comprise any type of computer, such as for example, a desktop computer, laptop computer, palmtop computer, hand-held computer, etc. Furthermore, the multi-antenna element structure 20 may also be inserted into interface slots associated with a plethora of other types of devices that may need to communicate wirelessly, such as for example, set-top boxes (including cable and XDSL), information appliances, printers, fax machines, scanners, storages devices, televisions, stereos, etc. The multi-antenna element structure 20 can be used for performing wireless communications to and from any of these devices.

In the illustrated embodiment, the interface slot 22 comprises a Personal Computer Memory Card International Association (PCMCIA) compliant slot, and the multi-antenna element structure 20 is constructed on a PCMCIA card 26. A PCMCIA card is a well-known, approximately credit card-size adapter which is inserted into a PCMCIA slot. PCMCIA cards are usable for many different types of I/O devices and are widely used, for example, with notebook computers. Although embodiments of the invention described herein are implemented on PCMCIA cards, it should be well understood that the antenna structures described herein may alternatively be implemented on many other types of cards, such as for example, interface cards, adapter cards, circuit boards, printed circuit boards, smart cards, etc., in accordance with the present invention. Furthermore, the interface slot 22 may comprise many different types of interface slots in accordance with the present invention. By way of example, the interface slot 22 may comprise a Peripheral Component Interconnect (PCI) compliant slot, Industry Standard Architecture (ISA) compliant slot, etc.

Figure 2A:
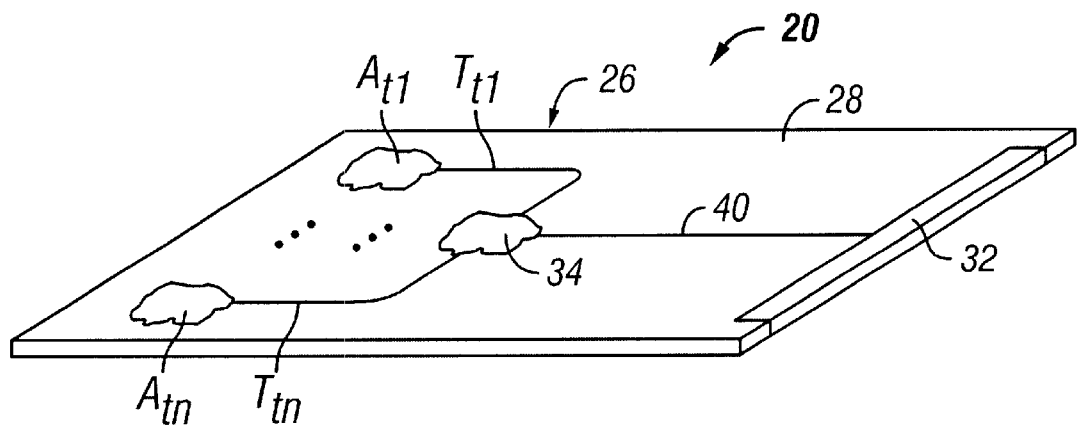
FIGS. 2A and 2B are perspective views illustrating the top and bottom surfaces, respectively, of the multi-antenna element structure shown in FIG. 1.
Figure 2B:
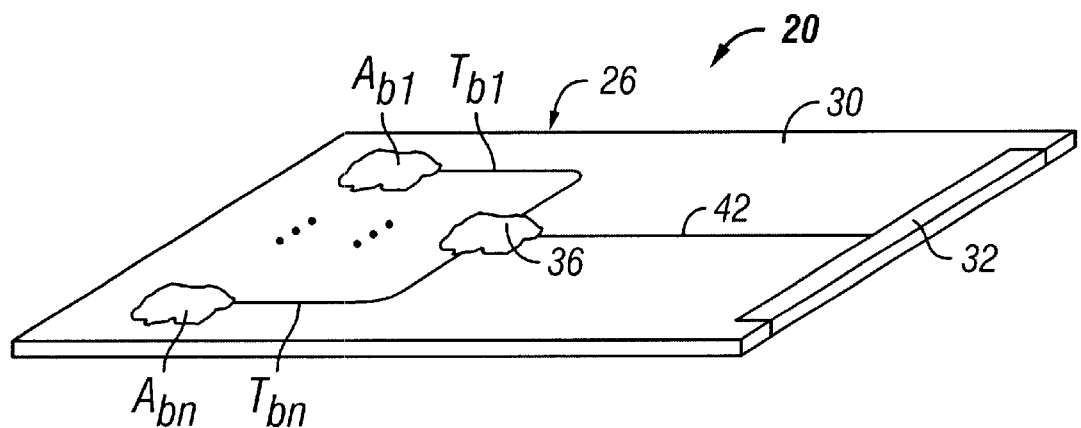

FIG. 2A illustrates the top surface 28 of the multi-antenna element structure 20, and FIG. 2B illustrates its bottom surface 30. One or more connectors 32 are typically located at one end of the card 26. The connectors 32 normally comprise a configuration or type that is appropriate for the particular interface being used, e.g., PCMCIA, PCI, ISA, etc.

Two or more antenna elements are preferably located at the other end of the card 26, i.e., the end opposite the connectors 32. The two or more antenna elements may be comprised of antenna elements $A_{t1}$ through $A_{tn}$ located on the top surface 28 of the card 26 and/or antenna elements $A_{b1}$ through $A_{bn}$ located on the bottom surface 30 of the card 26. Thus, the two or more antenna elements may be comprised of antenna elements located on the top surface 28, antenna elements located on the bottom surface 30, or antenna element(s) located on the top surface 28 and antenna element(s) located on the bottom surface 30.

The cloud-like shape of the antenna elements $A_{t1}$ through $A_{tn}$ and $A_{b1}$ through $A_{bn}$ shown in the drawings is intended to indicate that many different types of antennas may be used for implementing the antenna elements $A_{t1}$ through $A_{tn}$ and $A_{b1}$ through $A_{bn}$. Several exemplary types of antennas will be discussed in the examples below. Furthermore, it will be demonstrated that different types of antennas may even be used among the antenna elements $A_{t1}$ through $A_{tn}$ and $A_{b1}$ through $A_{bn}$.

Active circuitry, such as radio frequency (RF) circuitry, may also be conveniently located on the card 26. For example, active circuitry 34 may be located on the top surface 28 and/or active circuitry 36 may be located on the bottom surface 30. The active circuitry 34 and/or 36 may comprise power amplifiers for driving the antenna elements, low noise amplifiers (LNAs) for amplifying the received signals, RF switches for selecting signals routed to and from transmit and receive antenna elements, and/or digital baseband processing application specific integrated circuits (ASICs). The active circuitry 34 and/or 36 may also comprise additional circuitry that processes the transmitted and received signals, for example frequency translation from/to an intermediate frequency (IF) to/from the final radio frequency (RF) frequency.

Locating the active circuitry 34 and/or 36 on the card 26 has the advantage of allowing the active circuitry 34 and/or 36 to interface directly with the antenna elements, which simplifies signal routing and eliminates the need for coaxial antenna connections. Such location places the active circuitry 34 and/or 36 intimately close to the antenna elements, which minimizes signal losses. By way of example, traces $T_{t1}$ through $T_{tn}$ may be used to directly interface the antenna elements $A_{t1}$ through $A_{tn}$, respectively, with the active circuitry 34. Similarly, traces $T_{b1}$ through Tbn may be used to directly interface the antenna elements $A_{b1}$ through $A_{bn}$, respectively, with the active circuitry 36. Although traces $T_{t1}$ through $T_{tn}$ and $T_{b1}$ through $T_{bn}$ are illustrated as being located on the top surface 28 and bottom surface 30, respectively, it should be well understood that one or more of such traces may alternatively be located on one or more interior layers of the card 26. Examples of separate, interior layers of a card will be discussed below.

Because the active circuitry 34 and/or 36 is intimately close to the antenna elements, traces $T_{t1}$ through $T_{tn}$ and $T_{b1}$ through $T_{bn}$ can be very short, which means that the antenna elements are connected almost immediately to the inputs of the active circuitry 34 and/or 36. No coaxial antenna connections are necessary with this scheme. Short trace lengths are highly advantageous when operating at very high frequencies, such as 5GHz, due to the losses that can occur with long traces. Preferably, trace lengths of less than or equal to 0.5 to 1.0 inches are used.

The active circuitry 34 may be optionally coupled to the connectors 32 by means of one or more traces 40. Similarly, the active circuitry 36 may be optionally coupled to the connectors 32 by means of one or more traces 42. This way, information or data can be transferred to and from the active circuitry 34 and/or 36 by the device in which the card 26 is inserted, such as the computer 24. For example, data can be transferred to and from the active circuitry 34, over the one or more traces 40, through the connectors 32, through corresponding connectors in the interface slot 22, and onto or off of one or more busses in the computer 24. It should be well understood that one or more of the traces 40, 42 may alternatively be located on one or more interior layers of the card 26.

The multi-antenna element structure 20 is capable of achieving diversity. Specifically, spatial diversity can be achieved by spacing individual antenna elements apart so as to obtain sufficient decorrelation. Sufficient spacing of the individual antenna elements is important for obtaining minimum uncorrelated fading of antenna outputs. Preferably, at least some of the antenna elements $A_{t1}$ through $A_{tm}$ and $A_{b1}$ through $A_{bn}$ are spaced apart by a distance greater than or equal to $0.5\lambda$ for a frequency of operation falling within the 5 to 6 GHz frequency band. Because $\lambda$ is so small for the 5 to 6 GHz frequency band, such spacing of antenna elements can be accomplished on the small card 26, which for example may comprise a PCMCIA card.

Polarization diversity can be achieved in the multi-antenna element structure 20 when the polarizations of two of the antenna elements are orthogonal to each other. As will be discussed below, polarization diversity may be achieved in the present invention by using a combination of vertically and horizontally polarized antenna elements, or by positioning an active edge of one antenna element to be orthogonal to an active edge of another antenna element.

The multi-antenna element structures of the present invention are capable of achieving a high amount of diversity per unit volume by using simple antenna structures that can be hosted in a small form factor, such as a PCMCIA card form factor. Some embodiments of the present invention use a combination of spatial and polarization diversity to achieve a high number of reasonably uncorrelated antenna elements in the small form factor. It should be well understood, however, that some embodiments of the present invention may rely solely on spatial diversity and that some embodiments of the present invention may rely solely on polarization diversity.

When receiving a signal in a multi-path environment, the signal offered to the receiver contains not only a direct line-of-sight radio wave, but also a large number of reflected radio waves, which interfere with the direct wave to create a "composite signal." Two or more of the antenna elements $A_{t1}$ through $A_{tm}$ and $A_{b1}$ through $A_{bn}$ each receive this "composite signal." Each of these "composite signals" comprises a sum of the direct and alternate path signals, as well as signals that experience a change in polarization, which constructively and destructively interfere and create peaks and nulls. By relying on spatial diversity, polarization diversity, or a combination of both spatial and polarization diversity, the multi-antenna element structure 20 can compensate for fading because several replicas of the same information carrying signal are received over multiple channels by different antenna elements. There is a good likelihood that at least one or more of these received signals will not be in a fade at any given instant in time, thus making it possible to deliver adequate signal level to the receiver.

Because two or more of the antenna elements $A_{t1}$ through $A_{tm}$ and $A_{b1}$ through $A_{bn}$ are largely uncorrelated, more than one power amplifier stage in the transmitter can be used thereby reducing the maximum power level required out of any individual power amplifier stage. This is highly advantageous for Orthogonal Frequency Division Multiplexing (OFDM) where the peak-to-average power ratio is a concern. Specifically, the FCC limits the total transmit power allowed, so this peak can be shared if there is more than one power amplifier stage involved.

Figure 3A:
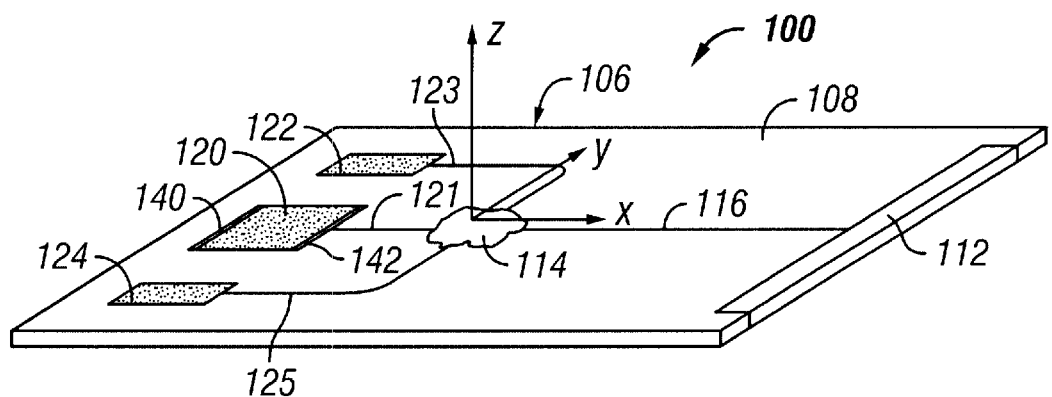
FIGS. 3A and 3B are perspective views illustrating the top and bottom surfaces, respectively, of a multi-antenna element structure made in accordance with another embodiment of the present invention.
Figure 3B:
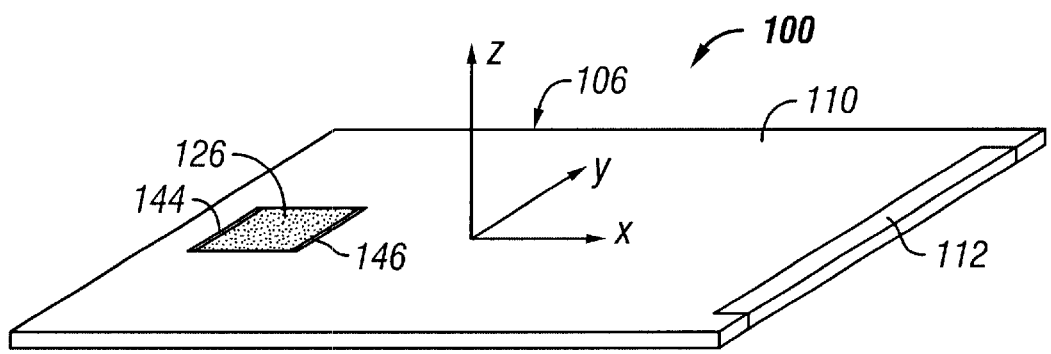

FIGS. 3A and 3B illustrate a multi-antenna element structure 100 made in accordance with another embodiment of the present invention. FIG. 3A illustrates the top surface 108 of the multi-antenna element structure 100, and FIG. 3B illustrates its bottom surface 110. The multi-antenna element structure 100 includes a card 106, such as for example a PCMCIA card. One or more connectors 112 are typically located at one end of the card 106. The connectors 112 normally comprise a configuration or type that is appropriate for the particular interface being used, e.g., PCMCIA, PCI, ISA, etc. Active circuitry 114, similar to the active circuitry 34 and/or 36 described above, may be conveniently located on one or more of the surfaces or interior layers of the card 106. The active circuitry 114 may be optionally coupled to the connectors 112 by means of one or more traces 116, which may be located on one or more of the surfaces or interior layers of the card 106.

In this embodiment, four separate antenna elements 120, 122, 124, 126 are attached to the card 106, preferably at the end of the card 106 opposite the connectors 112. Three of the antenna elements 120, 122, 124 are attached to the top surface 108, and one antenna element 126 is attached to the bottom surface 110. While this embodiment includes four antenna elements, the present invention is not limited to the use of four antenna elements and is intended to include the use of two or more antenna elements. Indeed, an embodiment having six antenna elements is discussed below.

Traces may be used to directly interface the antenna elements 120, 122, 124, 126 with the active circuitry 114. For example, the three antenna elements 120, 122, 124 may be directly interfaced with the active circuitry 114 by means of the traces 121, 123, 125, respectively, located on the top surface 108 of the card 106. It should be well understood, however, that one or more of such traces may alternatively be located on one or more interior layers of the card 106. For example, a trace used to directly interface the antenna element 126 with the active circuitry 114 may be located on an interior layer, and therefore is not seen in FIGS. 3A and 3B.

Traditional patch antennas or printed microstrip antenna elements are a very cost-effective way to realize one or more of the individual antenna elements 120, 122, 124, 126. Many different types of patch antennas may be used, including ¼-wave, ½-wave and ¾-wave patch antennas. In this embodiment, all four of the antenna elements 120, 122, 124, 126 are implemented with patch antennas. Preferably, the center antenna elements 120, 126 comprise ¼-wave or ½-wave patch antennas, and the side antenna elements 122, 124 comprise ¼-wave or ½-wave patch antennas. The patch antenna 120 includes active (radiating) edges 140, 142, and the patch antenna 126 includes active edges 144, 146. It should be well understood, however, that other types and configurations of patch antennas may be used in accordance with the present invention.

Figure 4A:
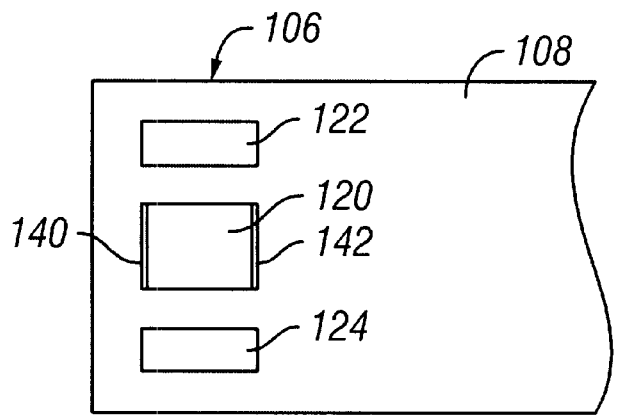
FIGS. 4A, 4B and 4C are a top view, center layer view, and bottom view, respectively, of the multi-antenna element structure shown in FIGS. 3A and 3B.
Figure 4B:
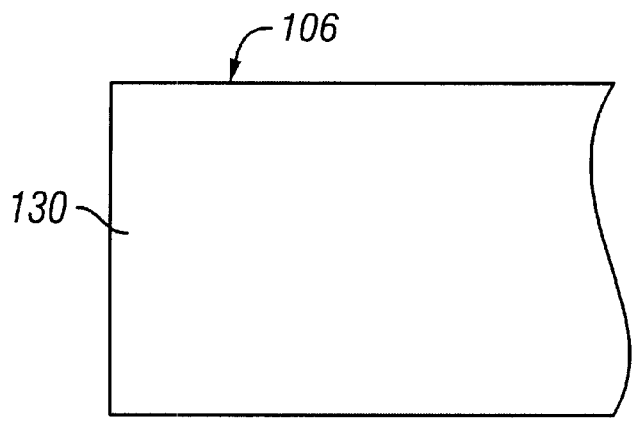
Figure 4C:
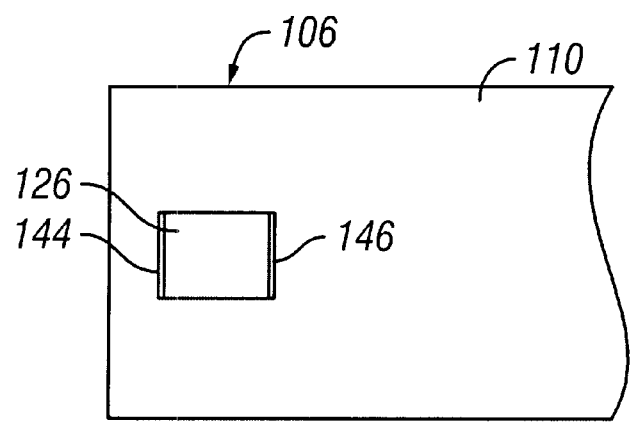

FIGS. 4A, 4B and 4C illustrate an exemplary manner in which the antenna elements 120, 122, 124, 126 can be implemented on the card 106 with patch antennas. In general, patch antenna elements can be fabricated according to a microstrip technique, where etched copper patterns lie above a ground plane. FIG. 4A illustrates the top surface 108 of the card 106, and FIG. 4C illustrates the bottom surface 110 of the card 106. FIG. 4B illustrates the center layer of the card 106 where a ground plane 130 is located. The ground plane 130 is positioned beneath each of the patch antenna elements 120, 122, 124, 126, which may each comprise an etched copper pattern. The ground plane 130 preferably extends to the edge of the card 106. Traces can be included in the center layer for connecting the antenna elements 120, 122, 124, 126 to the connectors 112 or other circuitry.

The detailed design process for an individual patch antenna is well known. Each of the antenna elements 120, 122, 124, 126 is preferably individually designed to have good gain and Voltage Standing Wave Ratio (VSWR). This is standard procedure in antenna design. In addition, the individual antenna element designs are preferably optimized to preserve good gain and VSWR while also delivering good inter-element isolation. In other words, the antenna elements are preferably designed to exhibit acceptably low cross-correlation (i.e., isolation). Good isolation is important for achieving good diversity gain. Thus, each of the antenna elements 120, 122, 124, 126 preferably provides gain while also having good isolation between itself and other antenna elements.

The separate antenna elements 120, 122, 124, 126 offer spatial and/or polarization diversity, which delivers good receive and transmit diversity performance. The multi-antenna element structure 100 is small and cost-effective. This is at least partly due to it physically residing on a portion of a small card, such as for example, a standard PCMCIA card. The multiple planar antenna element configuration is well suited to the form factor limits imposed by the PCMCIA card dimensions. Furthermore, printed copper (microstrip) techniques may be used to implement the actual antenna elements. This kind of construction is extremely low-cost and low-profile. Thus, the present invention provides for the inclusion of multiple antenna elements on a PCMCIA card form-factor that deliver good diversity performance at low cost. This configuration is very convenient for application in the 5 to 6 GHz frequency band where low-cost and antenna diversity is desired.

Figure 5A:
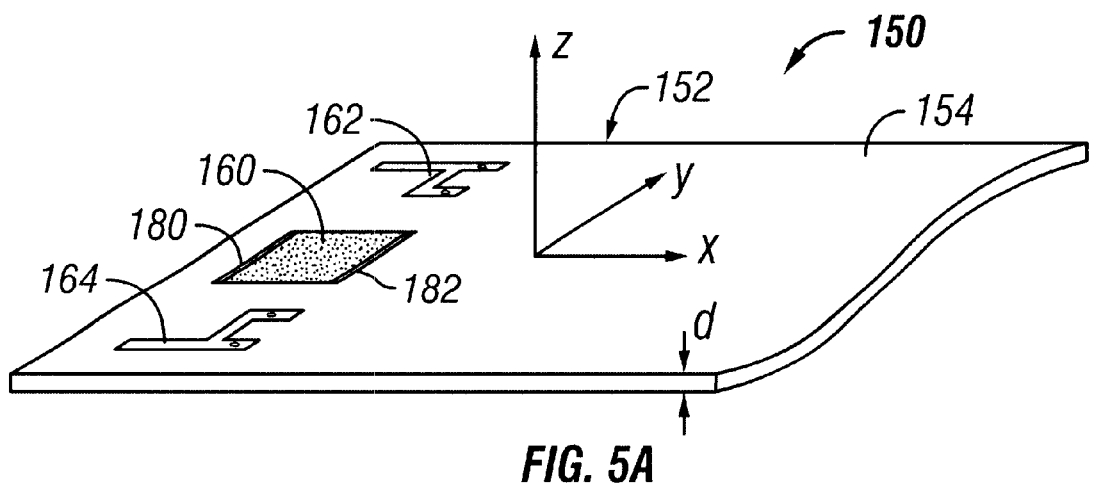
FIGS. 5A and 5B are perspective views illustrating the top and bottom surfaces, respectively, of a multi-antenna element structure made in accordance with another embodiment of the present invention.
Figure 5B:
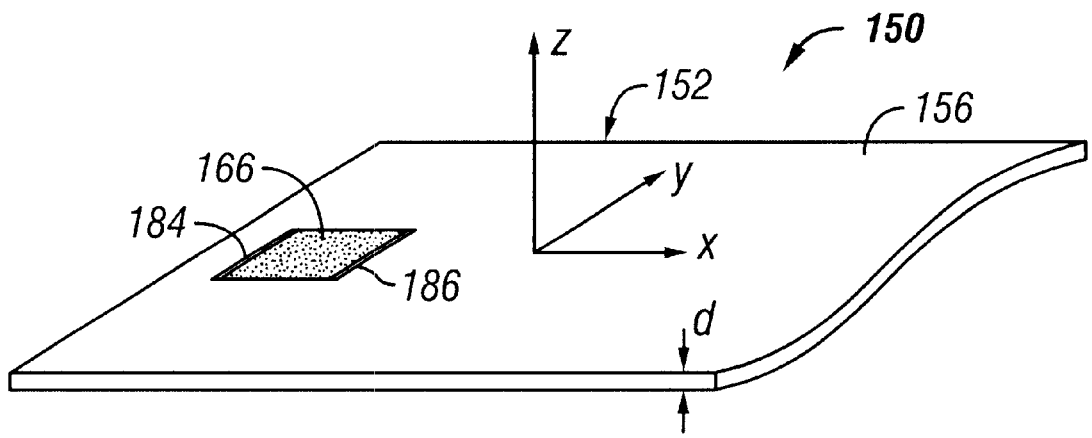

It should be well understood that all four of the antenna elements 120, 122, 124, 126 are not required to be implemented with patch antennas. For example, FIGS. 5A and 5B illustrate a multi-antenna element structure 150 made in accordance with another embodiment of the present invention. The multi-antenna element structure 150 includes a card 152, such as for example a PCMCIA card. FIG. 5A illustrates the top surface 154 of the card 152, and FIG. 5B illustrates the bottom surface 156. Connectors for the card 152, which would be similar to the connectors 112 described above, are not shown. Furthermore, active circuitry, similar to the active circuitry 34 and/or 36 described above, which may be located on one or more of the surfaces or interior layers of the card 152, is also not shown.

Similar to the card 106 described above, the top surface 154 of the card 152 includes three antenna elements 160, 162, 164, and the bottom surface 156 includes one antenna element 166. The center antenna elements 160, 166 preferably comprise ¼-wave or ½-wave patch antennas. Unlike the card 106, however, the side antenna elements 162, 164 preferably comprise ¼-wave or ½-wave horizontally polarized printed monopole antennas. The inclusion of the two horizontally polarized monopole antennas 162, 164 illustrates that other types and configurations of antennas may be used in accordance with the present invention.

Figure 6A:
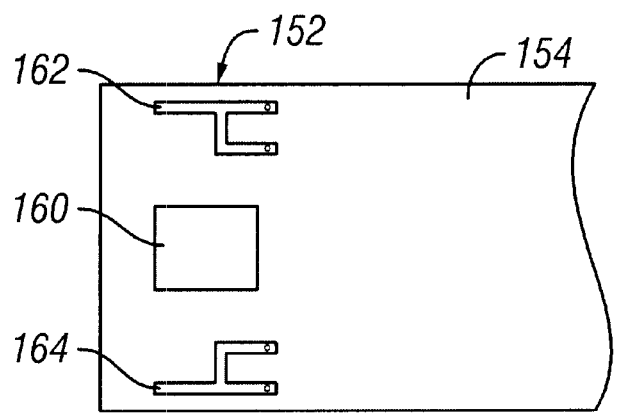
FIGS. 6A, 6B and 6C are a top view, center layer view, and bottom view, respectively, of the multi-antenna element structure shown in FIGS. 5A and 5B.
Figure 6B:
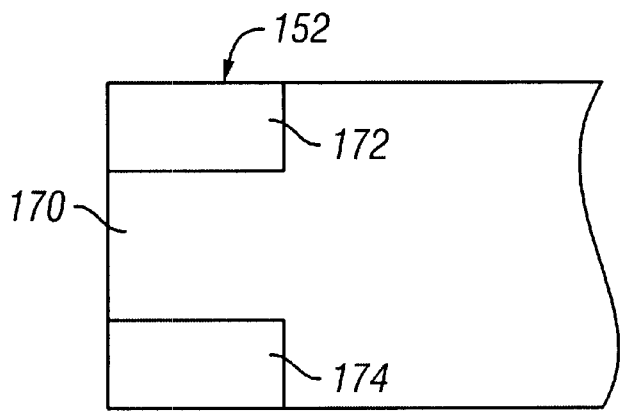
Figure 6C:
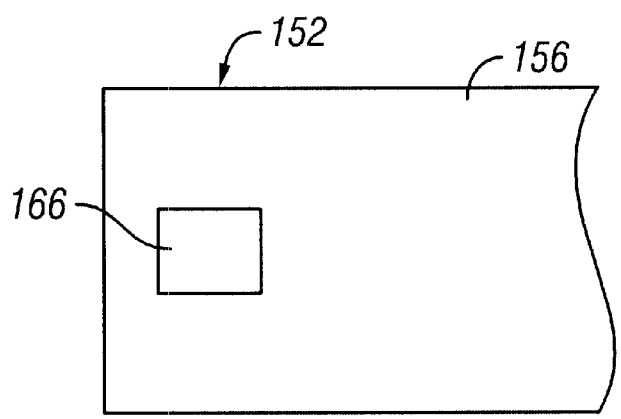

FIGS. 6A, 6B and 6C illustrate an exemplary manner in which both the patch antenna elements 160, 166 and the monopole antenna elements 162, 164 can be implemented on the card 152. FIG. 6A illustrates the top surface 154 of the card 152, and FIG. 6C illustrates the bottom surface 156. FIG. 6B illustrates the center layer of the card 152 where a ground plane 170 is located. The ground plane 170 comprises a shape such that it is positioned beneath each of the center patch antenna elements 160, 166 (which may each comprise an etched copper pattern). The ground plane 170, however, is cut away in the regions 172, 174 beneath the locations of the monopole antennas 162, 164, respectively. Except for in the cut away regions 172, 174, the ground plane 170 preferably extends to the edge of the card 152. Traces can be included in the center layer for connecting the antenna elements 160, 162, 164, 166 to the connectors or other circuitry (not shown) on the card 152.

Figure 7:
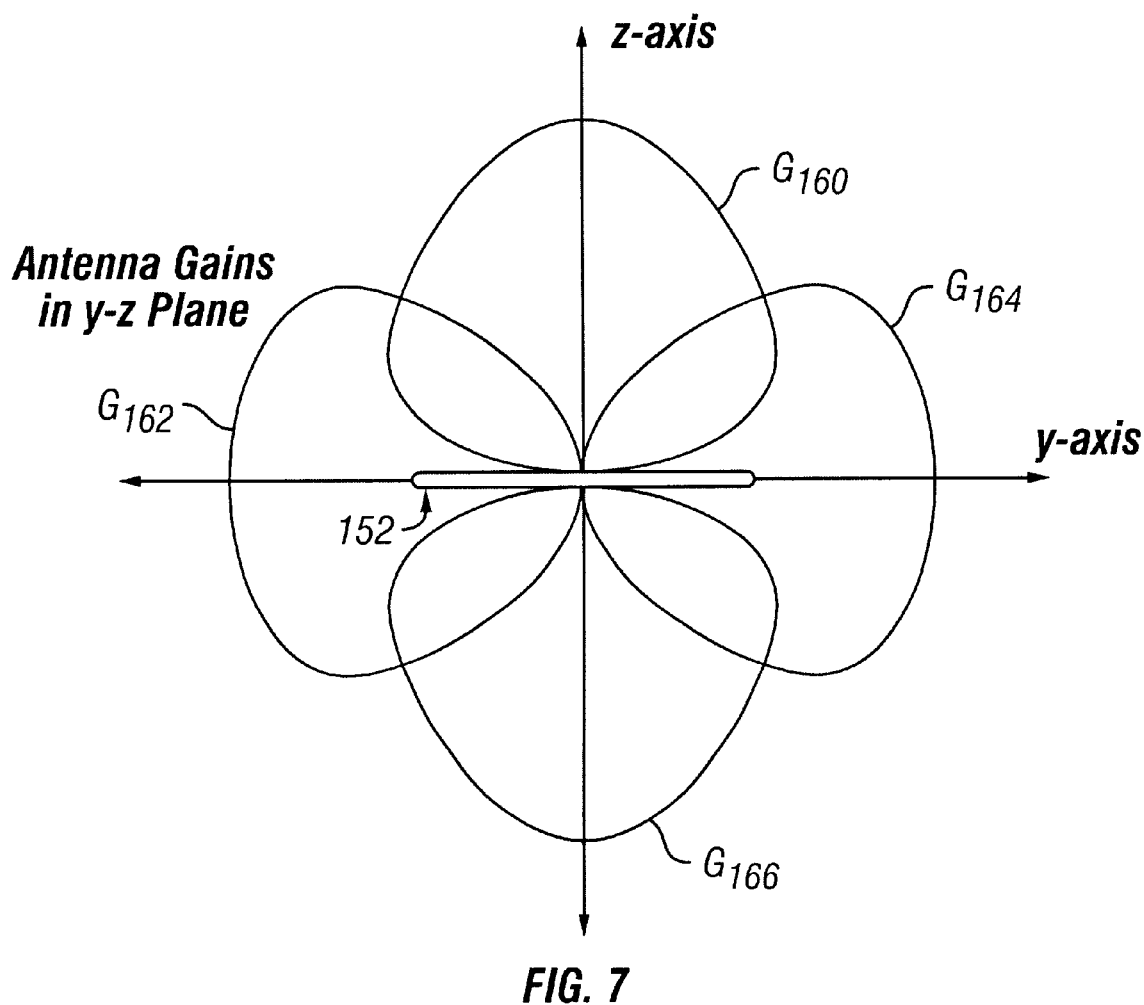
FIG. 7 is a plot illustrating antenna gain patterns for the multi-antenna element structure shown in FIGS. 5A and 5B.

The separate antenna elements 160, 162, 164, 166 offer spatial and/or polarization diversity, which delivers good receive and transmit diversity performance. FIG. 7 illustrates the antenna gain patterns $G_{160}$, $G_{162}$, $G_{164}$, $G_{166}$ that result for the four antenna elements 160, 162, 164, 166, respectfully. Ideally, the antenna gain patterns $G_{160}$, $G_{162}$, $G_{164}$, $G_{166}$ cross each other at approximately the −3 dB gain points (relative to the main lobe). When viewed in the y–z plane, a full 360 degrees of coverage is achieved.

Referring again to FIGS. 5A and 5B, the active (radiating) edges 180, 182 of the patch antenna 160, as well as the edges 184, 186 of the patch antenna 166, are purposely chosen to be orthogonal to the polarization present on the edge of the monopole antenna elements 162, 164. This orthogonality helps to achieve polarization diversity. Furthermore, this orthogonality permits separate transmitter power amplifier stages to drive one x-axis antenna element and one y-axis antenna element with low interaction. Since the transmitted power can then be shared between two antenna elements, the peak-power requirements for each power amplifier is reduced by 3 dB. If the power is additionally shared with the patch antenna element 166 on the bottom side 156 of the card 152, the total relaxation per power amplifier stage is 10 $Log_{10}(3)=5$ dB.

Figure 8A:
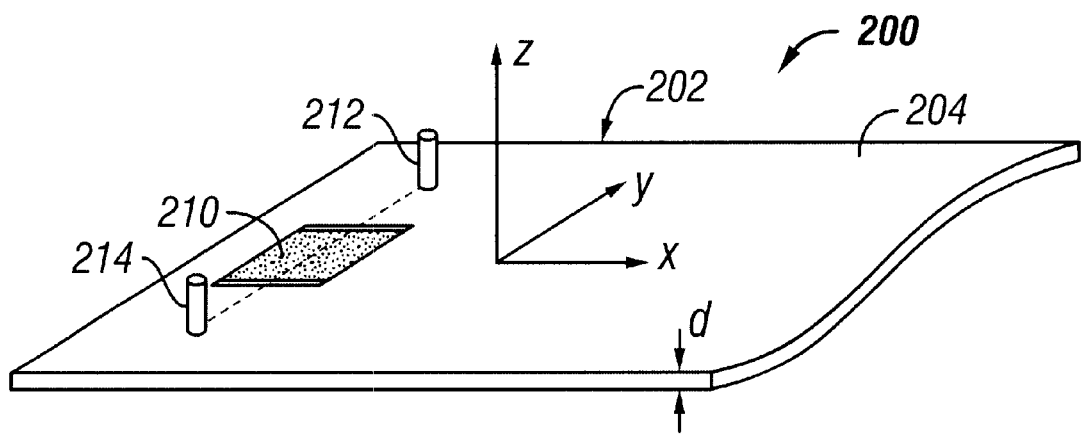
FIGS. 8A and 8B are partial perspective views illustrating the top and bottom surfaces, respectively, of a multi-antenna element structure made in accordance with another embodiment of the present invention.
Figure 8B:
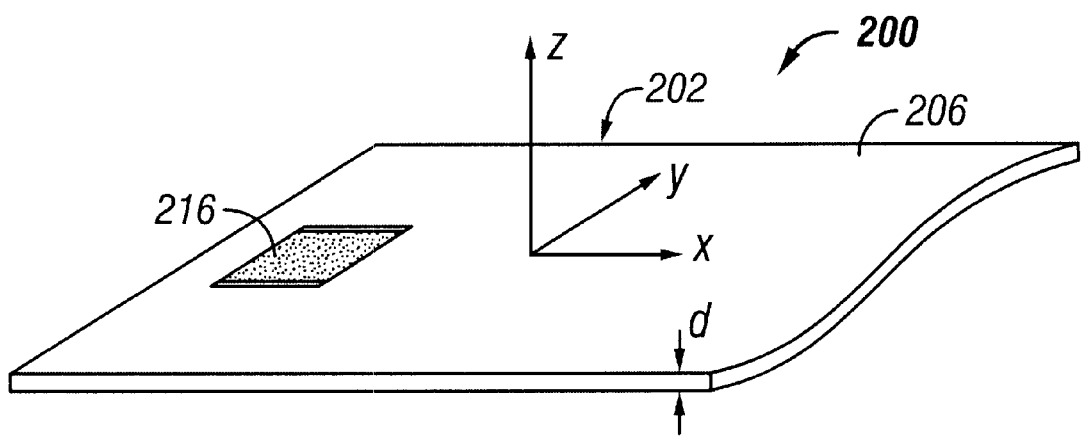

FIGS. 8A and 8B illustrate a multi-antenna element structure 200 made in accordance with another embodiment of the present invention. The multi-antenna element structure 200 includes a card 202, such as for example a PCMCIA card. FIG. 8A illustrates the top surface 204 of the card 202, and FIG. 8B illustrates the bottom surface 206. Active circuitry and connectors, which may be included on the card 202, are not shown.

Similar to the card 152 described above, the top surface 204 of the card 202 includes three antenna elements 210, 212, 214, and the bottom surface 206 includes one antenna element 216. The center antenna elements 210, 216 preferably comprise ¼-wave or ½-wave patch antennas. Unlike the card 152, however, the side antenna elements 212, 214 preferably comprise ¼-wave vertically polarized monopole antennas. The inclusion of the two side vertically polarized monopole antennas 212, 214 illustrates that other types and configurations of antennas may be used in accordance with the present invention. The vertically polarized monopole antennas 212, 214 provide λ/4 sections out-of-plane for different polarization. By way of example, the vertically polarized monopole antennas 212, 214 may comprise small circuit-board type antennas, ceramic elements, wire elements, etc.

Figure 9A:
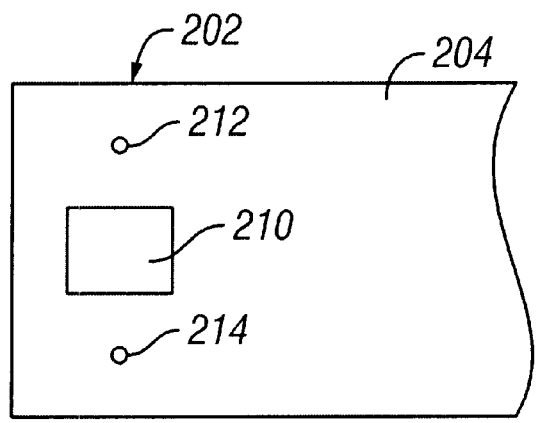
FIGS. 9A, 9B and 9C are a top view, center layer view, and bottom view, respectively, of the multi-antenna element structure shown in FIGS. 8A and 8B.
Figure 9B:
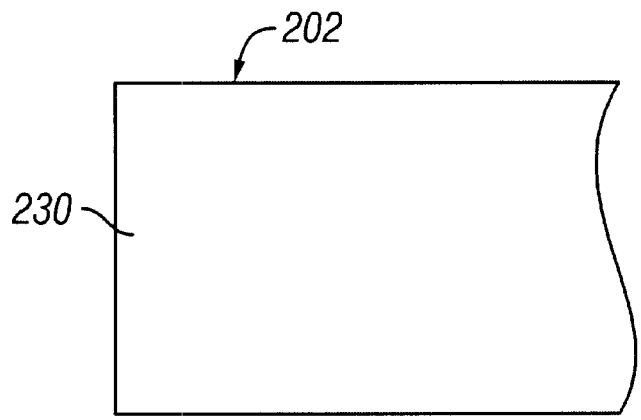
Figure 9C:
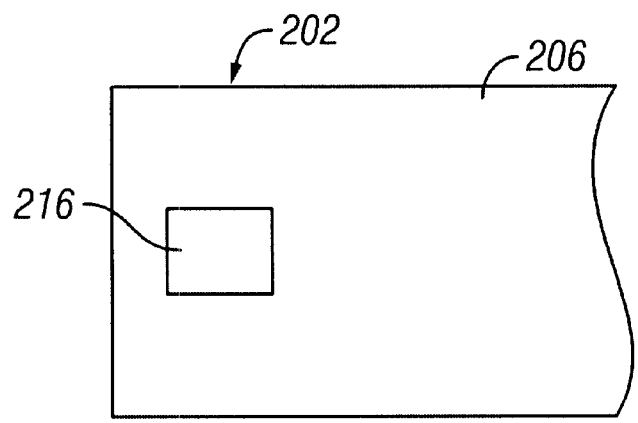

FIGS. 9A, 9B and 9C illustrate an exemplary manner in which both the patch antenna elements 210, 216 and the monopole antenna elements 212, 214 can be implemented on the card 202. FIG. 9A illustrates the top surface 204 of the card 202, and FIG. 9C illustrates the bottom surface 206. FIG. 9B illustrates the center layer of the card 202 where a ground plane 230 is located. The ground plane 230 comprises a shape such that it is positioned beneath each of the center patch antenna elements 210, 216 (which may each comprise an etched copper pattern), as well as the monopole antenna elements 212, 214. Because there are no monopole antenna elements located on the bottom surface 206, the monopole antenna elements 212, 214 on the top surface 204 use the ground plane 230 underneath them to "work against." The ground plane 230 preferably extends to the edge of the card 202. Traces can be included in the center layer for connecting the antenna elements 210, 212, 214, 216 to the connectors or other circuitry (not shown) on the card 202.

The above discussion presented various antenna means for realizing four-element diversity. The present invention, however, is not limited to the use of four antenna elements. Indeed, fewer or more than four antenna elements may be used in accordance with the present invention. Performance is increased markedly as the number of diversity antenna elements is increased from two to approximately eight. The following discussion presents a means to deliver six-element diversity.

Figure 10A:
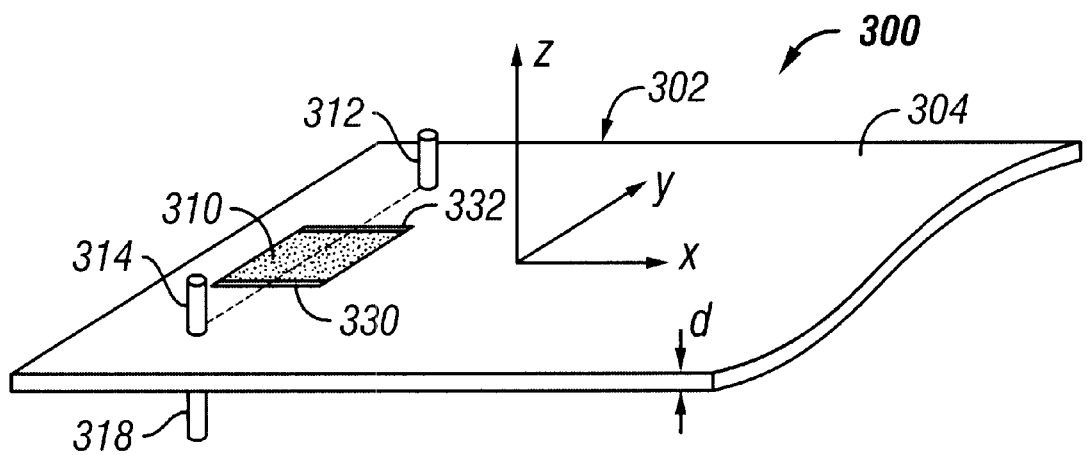
FIGS. 10A and 10B are partial perspective views illustrating the top and bottom surfaces, respectively, of a multi-antenna element structure made in accordance with another embodiment of the present invention.
Figure 10B:
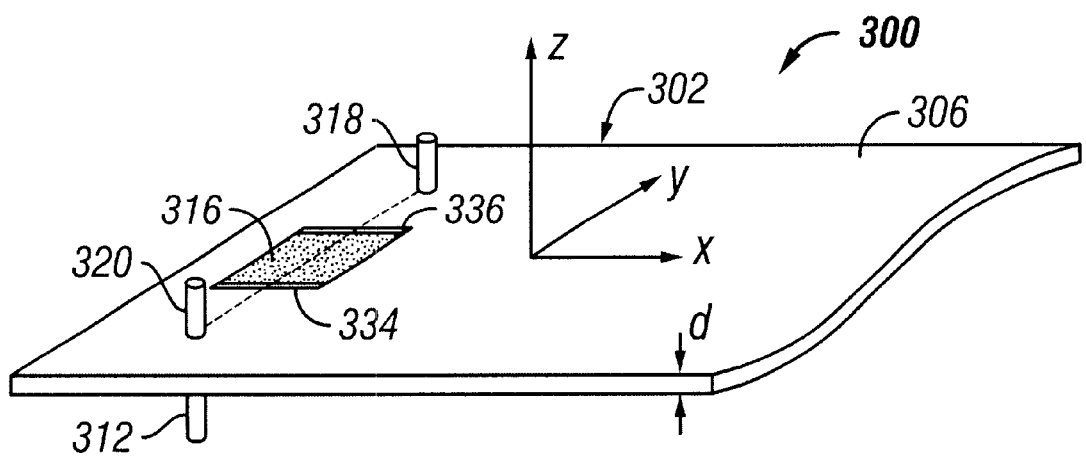

FIGS. 10A and 10B illustrate a multi-antenna element structure 300 made in accordance with another embodiment of the present invention. The multi-antenna element structure 300 includes a card 302, such as for example a PCMCIA card (but as discussed above, many different types of cards may be used). FIG. 10A illustrates the top surface 304 of the card 302, and FIG. 10B illustrates the bottom surface 306. Active circuitry and connectors, which may be included on the card 302, are not shown.

The multi-antenna element structure 300 includes six antenna elements 310, 312, 314, 316, 318, 320. The top surface 304 of the card 302 includes three antenna elements 310, 312, 314, and the bottom surface 306 includes three antenna elements 316, 318, 320. In this embodiment, the center antenna elements 310, 316 may comprise ¼-wave or ½-wave patch antennas, and the side antenna elements 312, 314, 318, 320 may comprise ¼-wave vertically polarized monopole antennas. It should be well understood, however, that various configurations and combinations of different types of antennas may be used in accordance with the present invention.

Similar to the multi-antenna element structures 100, 150, 200 described above, the detailed design process for individual patch and monopole antennas is well known. Each of the antenna elements 310, 312, 314, 316, 318, 320 is preferably individually designed to have good gain and VSWR. This is standard procedure in antenna design. In addition, the individual antenna elements 310, 312, 314, 316, 318, 320 are preferably optimized to preserve good gain and VSWR while also delivering good inter-element isolation. Good isolation is important for achieving good diversity gain. Thus, each of the antenna elements 310, 312, 314, 316, 318, 320 preferably provides gain while also having good isolation between itself and other antenna elements.

In this embodiment, different polarizations between the antenna elements 310, 312, 314, 316, 318, 320 can be used to realize low cross-correlation (i.e., isolation) between them. For example, the illustrated side monopole antenna elements 312, 314, 318, 320 are vertically polarized, which yields low cross-correlation with the center patch antenna elements 310, 316. Because the side monopole antenna elements 312, 314 (and 318, 320) are capable of being horizontally spaced at approximately $\lambda/2$ or more, they result in additional diversity gain for the system.

Figure 11:
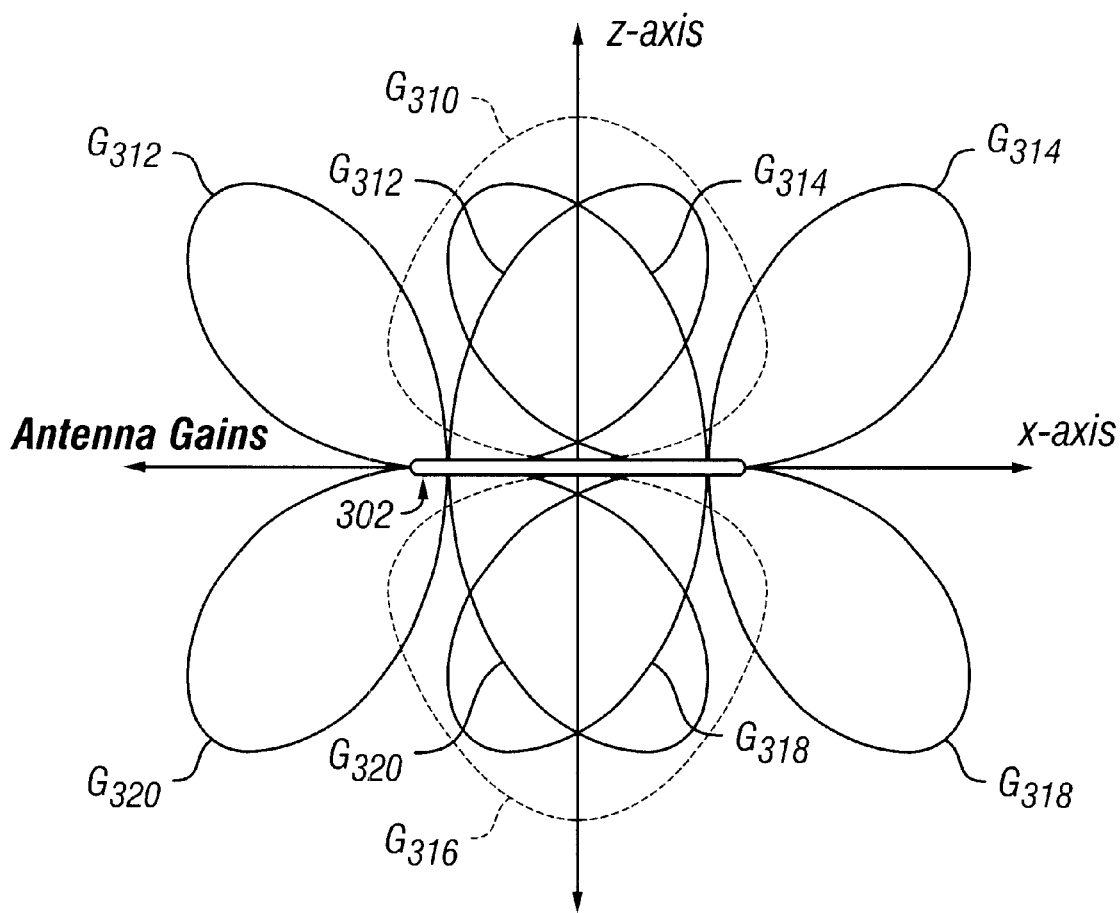
FIG. 11 is a plot illustrating antenna gain patterns for the multi-antenna element structure shown in FIGS. 10A and 10B.

The separate antenna elements 310, 312, 314, 316, 318, 320 offer spatial and/or polarization diversity, which delivers good receive and transmit diversity performance. FIG. 11 illustrates the individual antenna gain patterns $G_{310}$, $G_{312}$, $G_{314}$, $G_{316}$, $G_{318}$, $G_{320}$ in the y–z plane that result for the six antenna elements 310, 312, 314, 316, 318, 320, respectfully. When viewed in the y–z, x–z, or x–y planes, a full 360 degrees of coverage is achieved.

The vertical antenna elements 312, 314, 318, 320 (FIGS. 10A and 10B) may comprise standard $\lambda/4$ monopole antennas, or they can be implemented using a variety of modern materials (e.g., ceramics). By way of example, the vertically polarized antenna elements 312, 314, 318, 320 may comprise small circuit-board type antennas, ceramic elements, wire elements, etc. Whatever type of antenna or material that is used, a preferred feature for each of the antenna elements 312, 314, 318, 320 is E-field polarization out-of-the-plane (i.e., along the z-axis).

Two configuration options are possible for the vertical antenna elements 312, 314, 318, 320. In one option, the two vertical elements 312, 320 (and 314, 318) that are directly above and below each other may be used to form a traditional dipole antenna. In this scenario, the total number of diversity antenna elements realized is only four. If, however, each of the vertical antenna elements 312, 314, 318, 320 is situated above a ground plane (similar to the ground plane 130 of FIG. 4B), then a total of six different antenna branches can be realized.

In the six-element configuration where the vertical antenna elements 312, 314, 318, 320 are all (electrically speaking) $\lambda/4$ vertical elements, good diversity gain is best achieved when the vertical antenna elements 312, 314, 318, 320 are separated in the z-dimension by at least $\lambda/4$. In order to achieve this separation, the thickness d of the card 302 is preferably defined by the following equation:

$$d \geq \frac{\lambda}{4\sqrt{\varepsilon_r}}$$

where $\varepsilon_r$ is the relative dielectric constant of the card 302.

Figure 12:
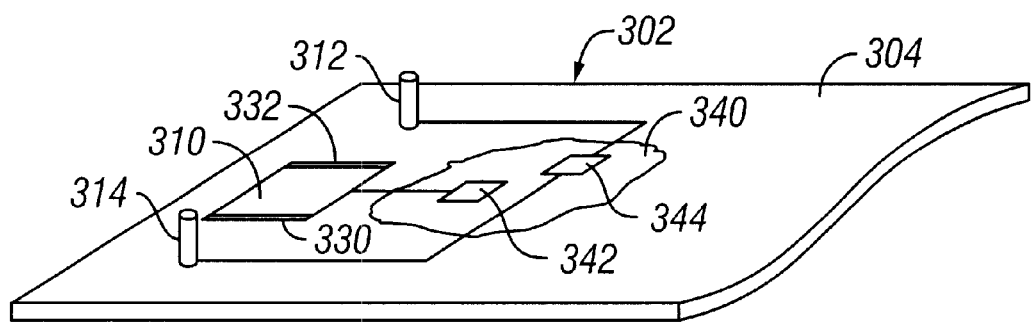
FIG. 12 is a partial perspective view illustrating in further detail the top surface of the multi-antenna element structure shown in FIG. 10A.

The active (radiating) edges 330, 332, 334, 336 of the patch antenna elements 310, 316 are preferably orthogonal to the polarization present on the dipole/monopole antenna elements 312, 314, 318, 320. This orthogonality helps to achieve polarization diversity. Furthermore, this orthogonality permits separate transmitter power amplifier stages to drive each of the two polarizations thereby lowering the required power amplifier output power (per branch) by 3 dB. For example, referring to FIG. 12, the active circuitry 340 which may be located on the card 302 can include one transmitter power amplifier stage 342 for driving the patch antenna element 310 and a separate transmitter power amplifier stage 344 for driving the monopole antenna elements 312, 314. If the same methodology is used on the under-side of the card 302, a total of 6 dB reduction in each individual power amplifier can be used while delivering the same total output power level.

Preferably, the position of the four vertical antenna elements 312, 314, 318, 320 are chosen to be symmetrically located with respect to the radiating edge edges 330, 332, 334, 336 of the patch antenna elements 310, 316. This lowers the near-field antenna energy from the patch antenna elements 310, 316 that is coupled into the vertical antenna elements 312, 314, 318, 320.

The diversity antenna 300 is very convenient for application in the 5 to 6 GHz frequency band where low-cost and antenna diversity are desired. Its multiple antenna element configuration is well suited to the form factor limits imposed by the dimensions of small cards, such as a PCMCIA. It can physically reside on a portion of such a card, and it can use a combination of printed copper (microstrip) techniques and lumped-element devices to implement the actual antenna elements. Thus, multiple antenna elements are provided in a small form-factor that deliver good diversity performance at low cost, which is particularly suited for use in wireless local area networks (WLAN) operating in the 5 GHz frequency bands.

U.S. patent application Ser. No. 09/693,465, filed Oct. 19, 2000, entitled DIVERSITY ANTENNA STRUCTURE FOR WIRELESS COMMUNICATIONS, by inventor James A. Crawford, is hereby fully incorporated into the present application by reference.

While the invention herein disclosed has been described by means of specific embodiments and applications thereof, numerous modifications and variations could be made thereto by those skilled in the art without departing from the scope of the invention set forth in the claims.

What is claimed is:

1. An antenna structure, comprising:
   a card configured for insertion into a slot of a device;
   at least two antenna elements attached to the card at a first end thereof, wherein the antenna elements are located and configured to provide at least one antenna gain pattern that provides at least some coverage on one side of the card and at least one antenna gain pattern that provides at least some coverage on another side of the card so that at least some coverage is provided on both sides of the card; and
   active circuitry attached to the card and coupled to the at least two antenna elements;
   wherein at least two of the at least two antenna elements are sufficiently spaced apart so as to achieve spatial diversity.

2. An antenna structure in accordance with claim 1, wherein the at least two antenna elements are spaced apart by a distance equal to or greater than $0.5\lambda$ for a predetermined frequency of operation.

3. An antenna structure in accordance with claim 2, wherein the predetermined frequency of operation falls within 5 to 6 gigahertz (GHz).

4. An antenna structure in accordance with claim 1, wherein a first of the at least two antenna elements comprises a polarization that is orthogonal to a polarization of a second of the at least two antenna elements so as to achieve polarization diversity.

5. An antenna structure in accordance with claim 4, wherein the first antenna element comprises an active edge that is orthogonal to an active edge of the second antenna element.

6. An antenna structure in accordance with claim 4, wherein the first antenna element comprises a patch antenna and the second antenna element comprises a monopole antenna.

7. An antenna structure in accordance with claim 4, wherein the active circuitry comprises;
   a first power amplifier coupled to the first antenna element; and
   a second power amplifier coupled to the second antenna element.

8. An antenna structure in accordance with claim 1, wherein the card comprises connectors located at a second end thereof configured for engagement with an interface slot.

9. An antenna structure in accordance with claim 1, wherein at least one antenna element is located on a first surface of the card and at least one antenna element is located on a second surface of the card.

10. An antenna structure in accordance with claim 1, wherein one or more of the at least two antenna elements comprises a patch antenna.

11. An antenna structure in accordance with claim 1, wherein one or more of the at least two antenna elements comprises a monopole antenna.

12. An antenna structure in accordance with claim 1, wherein one or more of the at least two antenna elements comprises a vertically polarized antenna.

13. An antenna structure in accordance with claim 1, wherein one or more of the at least two antenna elements comprises a horizontally polarized antenna.

14. An antenna structure in accordance with claim 1, wherein the at least two antenna elements comprise four antenna elements.

15. An antenna structure in accordance with claim 14, wherein three of the antenna elements are located on a first surface of the card and one of the antenna elements is located on a second surface of the card.

16. An antenna structure in accordance with claim 14, wherein all four of the antenna elements comprise patch antennas.

17. An antenna structure in accordance with claim 14, wherein two of the antenna elements comprise patch antennas and two of the antenna elements comprise monopole antennas.

18. An antenna structure in accordance with claim 1, wherein the at least two antenna elements comprise six antenna elements.

19. An antenna structure in accordance with claim 18, wherein three of the antenna elements are located on a first surface of the card and three of the antenna elements is located on a second surface of the card.

20. An antenna structure in accordance with claim 18, wherein two of the antenna elements comprise patch antennas and four of the antenna elements comprise monopole antennas.

21. An antenna structure, comprising:
   a card configured for insertion into a slot of a device;
   at least two antenna elements attached to the card at a first end thereof, wherein the antenna elements are located and configured to provide at least one antenna gain pattern that provides at least some coverage on one side of the card and at least one antenna gain pattern that provides at least some coverage on another side of the card so that at least some coverage is provided on both sides of the card; and
   active circuitry attached to the card and coupled to the at least two antenna elements;
   wherein a first of the at least two antenna elements comprises a polarization that is orthogonal to a polarization of a second of the at least two antenna elements so as to achieve polarization diversity.

22. An antenna structure in accordance with claim 21, wherein the first antenna element comprises an active edge that is orthogonal to an active edge of the second antenna element.

23. An antenna structure in accordance with claim 21, wherein the first antenna element comprises a patch antenna and the second antenna element comprises a monopole antenna.

24. An antenna structure in accordance with claim 21, wherein the active circuitry comprises;

a first power amplifier coupled to the first antenna element; and a second power amplifier coupled to the second antenna element.

25. An antenna structure in accordance with claim 21, wherein two of the at least two antenna elements are sufficiently spaced apart so as to achieve spatial diversity.

26. An antenna structure in accordance with claim 21, wherein two of the at least two antenna elements are spaced apart by a distance equal to or greater than 0.5λ for a predetermined frequency of operation.

27. An antenna structure in accordance with claim 26, wherein the predetermined frequency of operation falls within 5 to 6 gigahertz (GHz).

28. An antenna structure in accordance with claim 21, wherein the card comprises connectors located at a second end thereof configured for engagement with an interface slot.

29. An antenna structure in accordance with claim 21, wherein at least one antenna element is located on a first surface of the card and at least one antenna element is located on a second surface of the card.

30. An antenna structure in accordance with claim 21, wherein one or more of the at least two antenna elements comprises a patch antenna.

31. An antenna structure in accordance with claim 21, wherein one or more of the at least two antenna elements comprises a monopole antenna.

32. An antenna structure in accordance with claim 21, wherein one or more of the at least two antenna elements comprises a vertically polarized antenna.

33. An antenna structure in accordance with claim 21, wherein one or more of the at least two antenna elements comprises a horizontally polarized antenna.

34. An antenna structure in accordance with claim 21, wherein the at least two antenna elements comprise four antenna elements.

35. An antenna structure in accordance with claim 34, wherein three of the antenna elements are located on a first surface of the card and one of the antenna elements is located on a second surface of the card.

36. An antenna structure in accordance with claim 34, wherein all four of the antenna elements comprise patch antennas.

37. An antenna structure in accordance with claim 34, wherein two of the antenna elements comprise patch antennas and two of the antenna elements comprise monopole antennas.

38. An antenna structure in accordance with claim 21, wherein the at least two antenna elements comprise six antenna elements.

39. An antenna structure in accordance with claim 38, wherein three of the antenna elements are located on a first surface of the card and three of the antenna elements are located on a second surface of the card.

40. An antenna structure in accordance with claim 38, wherein two of the antenna elements comprise patch antennas and four of the antenna elements comprise monopole antennas.

41. A method of receiving a signal in a multi-path environment, comprising the steps of:

placing a card configured for insertion into a slot of a device in the multi-path environment, the card having active circuitry attached thereto;

receiving the signal with a first antenna element attached to the card at a first end thereof; and receiving the signal with a second antenna element attached to the card at the first end thereof;

wherein the first and second antenna elements are coupled to the active circuitry and are located and configured to provide at least one antenna gain pattern that provides at least some coverage on one side of the card and at least one antenna gain pattern that provides at least some coverage on another side of the card so that at least some coverage is provided on both sides of the card.

42. A method in accordance with claim 41, wherein the first and second antenna elements are sufficiently spaced apart so as to achieve spatial diversity.

43. A method in accordance with claim 41, wherein the first and second antenna elements are spaced apart by a distance equal to or greater than 0.5λ for a predetermined frequency of operation.

44. A method in accordance with claim 43, wherein the predetermined frequency of operation falls within 5 to 6 gigahertz (GHz).

45. A method in accordance with claim 41, wherein the first antenna element comprises a polarization that is orthogonal to a polarization of the second antenna element so as to achieve polarization diversity.

46. A method in accordance with claim 45, wherein the active circuitry comprises;

a first power amplifier coupled to the first antenna element; and a second power amplifier coupled to the second antenna element.

47. A method in accordance with claim 41, wherein the card comprises connectors located at a second end thereof configured for engagement with an interface slot.

48. A method in accordance with claim 41, wherein the first antenna element is located on a first surface of the card and the second antenna element is located on a second surface of the card.

49. A method of transmitting a signal in a multi-path environment, comprising the steps of:

placing a card configured for insertion into a slot of a device in the multi-path environment, the card having active circuitry attached thereto;

transmitting the signal with a first antenna element attached to the card at a first end thereof; and transmitting the signal with a second antenna element attached to the card at the first end thereof;

wherein the first and second antenna elements are coupled to the active circuitry and are located and configured to provide at least one antenna gain pattern that provides at least some coverage on one side of the card and at least one antenna gain pattern that provides at least some coverage on another side of the card so that at least some coverage is provided on both sides of the card.

50. A method in accordance with claim 49, wherein the first and second antenna elements are sufficiently spaced apart so as to achieve spatial diversity.

51. A method in accordance with claim 49, wherein the first and second antenna elements are spaced apart by a distance equal to or greater than 0.5λ for a predetermined frequency of operation.

52. A method in accordance with claim 51, wherein the predetermined frequency of operation falls within 5 to 6 gigahertz (GHz).

53. A method in accordance with claim 49, wherein the first antenna element comprises a polarization that is orthogonal to a polarization of the second antenna element so as to achieve polarization diversity.

54. A method in accordance with claim 53, wherein the active circuitry comprises;

a first power amplifier coupled to the first antenna element; and a second power amplifier coupled to the second antenna element.

55. A method in accordance with claim 49, wherein the card comprises connectors located at a second end thereof configured for engagement with an interface slot.

56. A method in accordance with claim 49, wherein the first antenna element is located on a first surface of the card and the second antenna element is located on a second surface of the card.

* * * * *